(12) United States Patent
Langer et al.

(10) Patent No.: US 11,500,107 B2
(45) Date of Patent: Nov. 15, 2022

(54) METHOD FOR DETERMINING AN ELECTRON DENSITY DISTRIBUTION IN THE EARTH'S ATMOSPHERE

(71) Applicant: Robert Bosch GmbH, Stuttgart (DE)

(72) Inventors: Markus Langer, Asperg (DE); Marco Limberger, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 299 days.

(21) Appl. No.: 16/476,213

(22) PCT Filed: Jan. 4, 2018

(86) PCT No.: PCT/EP2018/050163
§ 371 (c)(1),
(2) Date: Jul. 5, 2019

(87) PCT Pub. No.: WO2018/153553
PCT Pub. Date: Aug. 30, 2018

(65) Prior Publication Data
US 2021/0141095 A1 May 13, 2021

(30) Foreign Application Priority Data

Feb. 22, 2017 (DE) ...................... 10 2017 202 844.0
Mar. 20, 2017 (DE) ...................... 10 2017 204 580.9

(51) Int. Cl.
*G01S 19/07* (2010.01)
*G01S 19/08* (2010.01)

(52) U.S. Cl.
CPC ............ *G01S 19/072* (2019.08); *G01S 19/08* (2013.01)

(58) Field of Classification Search
CPC ........ G01S 19/07; G01S 19/072; G01S 19/08; G01S 19/32; G01S 19/44; G01S 19/40; G01S 19/43

(Continued)

(56) References Cited

U.S. PATENT DOCUMENTS

| 5,828,336 A | 10/1998 | Yunck et al. |
| 5,943,629 A * | 8/1999 | Ballard ............ H04B 7/18519 702/2 |

(Continued)

FOREIGN PATENT DOCUMENTS

| JP | 2004-271317 A | 9/2004 |
| JP | 2011-137698 A | 7/2011 |

OTHER PUBLICATIONS

International Search Report corresponding to PCT Application No. PCT/EP2018/050163, dated Apr. 16, 2018 (German and English language document) (8 pages).

(Continued)

*Primary Examiner* — Erin F Heard
*Assistant Examiner* — Michael W Justice
(74) *Attorney, Agent, or Firm* — Maginot, Moore & Beck LLP

(57) ABSTRACT

A method for determining a four-dimensional ionosphere model of an electron distribution in the Earth's atmosphere is disclosed, which is used to correct runtime measurements of signals emitted by satellites, for position determinations by means of signal receivers. The method comprises: a) defining at least one distribution function based on at least one function parameter which is suitable to describe a distribution of electrons over the height of the Earth's atmosphere; b) receiving data from a plurality of runtime measurements by means of a plurality of movable dual-frequency signal receivers, in order to determine parameters that are representative for a total quantity of electrons along a signal transmission path from a satellite to a dual-frequency signal receiver; c) determining location-dependent and time-dependent function parameters for the distribution function at least by means of the parameters; and d) pro- (Continued)

viding the function parameters determined in step c) as a four-dimensional ionosphere model.

9 Claims, 2 Drawing Sheets

(58) Field of Classification Search
USPC .................................. 342/357.358, 44, 23, 27
See application file for complete search history.

(56) References Cited

U.S. PATENT DOCUMENTS

| | | | | |
|---|---|---|---|---|
| 9,470,795 | B2* | 10/2016 | Rao | G01S 19/07 |
| 9,488,735 | B2* | 11/2016 | Tominaga | G01S 19/073 |
| 9,494,693 | B2* | 11/2016 | Hernandez-Pajares | G01S 19/29 |
| 10,254,409 | B2* | 4/2019 | Jakowski | G01S 19/071 |
| 2006/0229813 | A1* | 10/2006 | Tobiska | G01W 1/10 702/2 |
| 2008/0309550 | A1 | 12/2008 | Sairo et al. | |
| 2013/0050024 | A1* | 2/2013 | Barott | G01S 13/003 342/454 |
| 2014/0070992 | A1* | 3/2014 | Hernandez-Pajares | G01S 19/02 342/357.395 |
| 2015/0077288 | A1* | 3/2015 | Rao | G01S 19/05 342/357.51 |
| 2016/0282472 | A1* | 9/2016 | Jakowski | G01S 19/071 |
| 2018/0031711 | A1* | 2/2018 | Cash | G01S 19/071 |

OTHER PUBLICATIONS

Angrisano, et al.; Benefit of the NeQuick Galileo Version in GNSS Single-Point Positioning; International Journal of Navigation and Observation; Sep. 30, 2013; 11 Pages; vol. 2013; Hindawi Publishing Corporation.

Colombo, et al.; Extending Wide Area and Virtual Reference Station Networks Far Into the Sea With GPS Buoys; ION GNSS 2005 Meeting; Sep. 2005; 13 Pages.

Psiaki, et al.; Nonlinear Estimation to Assimilate GPS TEC Data into a Regional Ionosphere Model; ION GNSS+ 2015; Sep. 14-18, 2015; 14 Pages.

Nava, et al.; A new version of the NeQuick ionosphere electron density model; Journal of Atmospheric and Solar-Terrestrial Physics; Elsevier Ltd.; Feb. 5, 2008; pp. 1856-1862.

* cited by examiner

METHOD FOR DETERMINING AN ELECTRON DENSITY DISTRIBUTION IN THE EARTH'S ATMOSPHERE

This application is a 35 U.S.C. § 371 National Stage Application of PCT/EP2018/050163, filed on Jan. 4, 2018, which claims the benefit of priority to Serial Nos. DE 10 2017 202 844.0, filed on Feb. 22, 2017 in Germany and DE 10 2017 204 580.9, filed on Mar. 20, 2017 in Germany, the disclosures of which are incorporated herein by reference in their entirety.

BACKGROUND

The disclosure relates to a method for determining an electron density distribution in the Earth's atmosphere.

The ionosphere refers to a region of the Earth's upper atmosphere, which extends approximately between altitudes of 50 km and 1000 km and merges above into the plasmasphere. The ionosphere is distinguished by an increased concentration of charged particles, such as ions and free electrons, which is formed by ionization processes as a function of the solar radiation. Depending on the frequency and strength of the ionization, electromagnetic signals in the ionosphere are refracted. This gives rise to signal delays in the observations of global satellite navigation systems (GNSS), for example the American GPS or the European Galileo, which are numbered among the main error sources in positioning and navigation applications. With the use of expensive geodetic dual-frequency signal receivers, signal combinations may be applied in order to eliminate the first-order ionosphere influence. Substantially more economical single-frequency signal receivers necessarily need to resort to atmospheric models in order to correct the signals and achieve accuracies <1 m.

In order to correct the ionosphere influence, for example in positioning and navigation applications, the integrated electron density, the so-called total electron content (TEC) is commonly used as a correction parameter.

This TEC may be stored as a function of longitude, latitude and time in an atmospheric model of a single-frequency signal receiver. In order to provide the position- and time-dependent TEC data, reference measurements are carried out with expensive geodetic dual-frequency signal receivers, since the TEC can be extracted from dual-frequency GNSS observations. Because of the small number of, and large distance between, corresponding reference stations, however, the resolution of the TEC data determined in this way is very low.

SUMMARY

Proposed here is a method for determining an electron density distribution in the Earth's atmosphere. In the method, the electron density distribution is provided in the form of a four-dimensional ionospheric model. The electron density distribution is used in order to correct time-of-flight measurements of signals that are transmitted by satellites for position determinations with signal receivers.

A four-dimensional ionospheric model is distinguished, in particular, in that a determination of an electron density is possible in four dimensions (three spatial dimensions and one time dimension).

The (local) electron density in the ionosphere has a close relationship with a (local) ion density in the ionosphere. Sometimes, the two values are identical or proportional. For this reason, the electron density or the ion density is resorted to in order to describe the ionosphere, depending on the context.

In step a), for example, a so-called Chapman function or a so-called Epstein function may be used as the distribution function. The distribution function may be established by a model, such as an atmospheric or ionospheric model, in which and/or in connection with which the method is used. These functions in each case offer an estimate of the distribution of the electron density as a function of height reject. In order to estimate this distribution, these functions require at least one function parameter. The Chapman function comprises, for example, exponential function components and may be used in order to describe the vertical electron density distribution. The Chapman function has, for example, at least three function parameters, namely the maximum electron density along the height, the height at which this maximum electron density occurs, and the associated scale height. If these function parameters are available as a function of the geodetic longitude, the geodetic latitude and time, the Chapman function may be used in order to determine an electron density at a particular height. A four-dimensional electron density model is thus formed. The Chapman function may be used, by estimating the temporal/spatial variation of the function parameters, for time-dependent description of the ion or electron density distribution in all three spatial directions. The use of the Chapman function or the Epstein function has, in particular, the advantage over conventional TEC-based methods for the definition of a model of an ion distribution or electron distribution in the atmosphere that a tomographic view of the spatial ion or electron density distribution, and in particular of effects of perturbations in the vertical atmospheric structure or ionospheric structure, is possible. In conventional methods, the TEC, i.e. the integrated electron density, is determined for longitude, latitude and time, but without a height reference. Furthermore, for each geodetic position and each instant for which an electron density is intended to be defined, in a four-dimensional ionospheric model only a small number of parameters are necessary as a result of the profile function (for example, three for the Chapman function). The parameters determined in steps b) and c) may, in particular, be TECs (total electron content: TEC) or parameters which allow direct deduction of TECs. In order to determine the (first and second) parameters, the dual-frequency signal receivers may record so-called code and carrier phase measurements of navigation satellites on two frequencies. In the GPS, for example, these are the frequencies L1 (1575.42 MHz) and L2 (1227.60 MHz). By taking the difference of the signals (for example L1-L2), error terms which have the same effect on both frequencies can be eliminated. This is referred to as geometry-free linear combination. The influence of the ionosphere on the signal propagation is, however, dispersive, i.e. the influence is different on the two frequencies. By known mathematical methods, the TEC can be calculated from this property. Since the TEC is the integrated electron density along the signal path, it contains information about the electron density distribution.

The dual-frequency signal receivers which are used in step b) may be stationary (GNSS reception stations) or mobile (GNSS receivers on vehicles). A multiplicity of first parameters are thus determined at different spatial positions.

Furthermore preferable is the combination of the dual-frequency signal receivers in and/or on (motor) vehicles used in step b) and static reference stations. If the dual-frequency signal receivers are arranged in and/or on (motor) vehicles, vehicle data and/or vehicle-based GNSS data may additionally be employed in order to determine the parameters. The use of vehicle-based dual-frequency signal receivers offers the particular advantage that sufficient temporal and spatial coverage may be achieved for determination of the function parameters, and no additional measures of positioning the dual-frequency signal receivers at different places are necessary. By arrangement in a motor vehicle, a regular position change of the dual-frequency signal receivers takes place. Optimal coverage is thus achieved, which could not be achieved merely with stationary dual-frequency signal receivers.

Preferably, parameters from a multiplicity of stationary dual-frequency signal receivers are additionally used in step b). In other words, this means, in particular, that the stationary dual-frequency signal receivers are located in or on measurement stations which are respectively arranged at a known and fixed position in the geodetic coordinate system. Corresponding measurement stations are also referred to as reference stations.

Preferably, an orientation of signal propagation paths obliquely with respect to a perpendicular direction is respectively evaluated in step b). Expressed in other words, in addition to the time-of-flight measurements along the signal propagation paths, the orientations, or the spatial positions and/or extents of the signal propagation paths, are also determined in steps b) and c). If the orientations of the signal propagation paths are known, total quantities of ions determined along the oblique or inclined signal propagation paths (so-called slant total electron contents, sTECs) may be converted into total quantities of ions or electrons along a vertical direction (so-called vertical TECs, vertical total electron contents, vTECs). Corresponding conversion, or transformation, methods are known. The vertical TEC is commonly referred to merely as the TEC.

If a satellite is arranged directly over a receiver, a signal of this satellite, received by this receiver, travels precisely through the ion distribution, or electron distribution, along the height of the atmosphere directly over the receiver. A (first or second) parameter would then be directly representative of the electron density distribution at or over, the position of the receiver.

In practice, however, it very rarely happens that determinations of (first or second) parameters are possible with satellites which are located directly over the respective receivers. Usually, the available satellites from which signals are received are located obliquely over the respective receiver, so that signal propagation paths from the satellites to the receivers are oriented obliquely with respect to a vertical direction (i.e. at an angle to a vertical direction). Then, signals along the respective signal propagation path travel through different height regions of the ionosphere at different geodetic positions. From a large number of parameters which are representative of the total quantity of ions or electrons along such oblique signal propagation paths, a system of equations can be set up which allows conclusions about the height-related ion distribution at various geodetic positions and from which the model of an ion distribution or electron distribution (or function parameters of distribution functions of a model of an ion distribution or electron distribution) can be determined.

If the Chapman function is established as the distribution function, the position- and time-dependent function parameters determined in step d) may comprise at least the following parameters:
maximum electron density along the height,
the height at which this maximum electron density occurs, and
the associated scale height.

The function parameters are preferably developed in series expansions of mathematical spatiotemporal basis functions with so-called model coefficients. The function parameters may, however, also be estimated (directly) with the first parameters and the second parameters.

Corresponding estimation methods are, in particular, known for the application of Chapman or Epstein functions. Preferably, the function parameters are parameterized by mathematical basis functions, for example by means of spherical harmonics, so that an area-covering representation thereof is possible.

In step d), the function parameters determined in step c) may be provided in an atmospheric or ionospheric model, in particular a four-dimensional electron density model.

The model may be stored in an evaluation unit, which is used for the correction of position data, of a vehicle. Preferably, the model is stored in an evaluation or computation unit of a data center in which the model formation is carried out centrally. The model may then be provided via networks (for example via a cellphone network) for single-frequency signal receivers.

If the determination of position- and time-dependent function parameters for the distribution function according to step d) is carried out on the receiver side, the function parameters calculated in step d) may, for example, be sent to the data center via a cable link (stationary receivers), a radio link and/or a satellite link.

Preferably, the calculation of position- and time-dependent function parameters for the distribution function according to step c) is carried out in the data center. Thus, the (first and second) parameters determined in step b) may, for example, be sent to the data center via a cable link (stationary receivers), a radio link and/or a satellite link.

A four-dimensional electron density model offers the particular advantage that it allows significant added value for safety-critical GNSS applications, particularly in terms of confidence and integrity. In the four-dimensional electron density model, the electron density is modeled as a function of (geodetic) longitude, latitude, height and time. Besides the ionospheric climatology, i.e. periodic effects such as variation of the ionosphere activity with the solar 11-year cycle, annual and seasonal variations and/or diurnal variation, it is also advantageously possible to map highly dynamic irregular phenomena such as (medium- and large-scale) traveling ionospheric disturbances (TIDs, MSTIDs, LSTIDs), sudden ionospheric disturbances (SIDs), spread F-layer, sporadic E-layer, ionospheric storms, and/or scintillations in a profile structure in the four-dimensional electron density model. Such phenomena can be picked up in the TEC for a propagation path only as a gradient. By the combination of a multiplicity of data in step c), it is possible to pick up such phenomena. Furthermore, the four-dimensional model allows assignment of the perturbation sources into the different height region of the ionosphere (D-, E-, F-layer).

According to one advantageous configuration, it is proposed that a position- and time-dependent total electron content be calculated in a further step e) by integration of the at least one distribution function.

The integration may in this case be carried out along a signal propagation path or along a vertical. Preferably, the integration is carried out between an initial height and a final height of an atmospheric or ionospheric layer. For example, a raytracing method and/or a Gauss-Legendre method may be used as the integration method. Step e) may be carried out on the receiver side or in the data center.

According to another advantageous configuration, it is proposed that correction data, in particular TEC data, which are provided to a multiplicity of in particular mobile or moved single-frequency signal receivers, be determined with or from the in particular four-dimensional model of the ion distribution or electron distribution. The correction data may be determined in the data center and sent to a multiplicity of single-frequency signal receivers, for example via a radio link and/or a satellite link. In particular, it is possible to provide correction data position-dependently. It is not necessary to provide each single-frequency signal receiver with the entire four-dimensional ionospheric model. Rather, it is sufficient to provide correction data for a particular position and a particular instant. It is optionally also possible to provide correction data for an individual measurement, in the scope of a position determination, directly with the satellite with which the respective measurement is carried out in the scope of a position determination. The single-frequency signal receivers may for example be arranged on or in (motor) vehicles (without dual-frequency signal receivers), ships, buoys, agricultural equipment or machines, portable GNSS receivers, cell phones or other electronic articles. Particularly preferably, the mobile single-frequency signal receivers are arranged in or on (autonomously operable) vehicles. With the correction data determined on the basis of the in particular four-dimensional model of the ion distribution or electron distribution, ionospheric models stored in the single-frequency signal receivers may be corrected, or updated.

Furthermore, model analyses, for example in the data centers, allow conclusions about possible ionospheric perturbations, which may be sent for example in the form of quality indicators to the user as an integrity measure. This additional integrity information provides significant added value in particular for safety-critical applications.

According to another aspect, a use of mobile or moved dual-frequency signal receivers for the determination of a four-dimensional ionospheric model is proposed. Optionally, stationary, static dual-frequency signal receivers may additionally also be used in order to determine the four-dimensional ionospheric model. The ionospheric model may be an electron density model, which preferably describes a four-dimensional ion and/or electron density distribution in the Earth's atmosphere or the ionosphere. Preferably, the four-dimensional ionospheric model is used in order to correct or update ionospheric models stored in, in particular, mobile or moved single-frequency signal receivers. Particularly preferably, the mobile single-frequency signal receivers are arranged in or on (autonomously operable) vehicles.

According to one advantageous configuration, the mobile dual-frequency signal receivers are arranged in or on vehicles.

The arrangement of the dual-frequency signal receivers in or on vehicles has, inter alia, the advantage that the dual-frequency signal receivers in or on vehicles are located on roads during regular operation of the vehicles. The purpose of the ionospheric model provided is, in particular, to increase the accuracy of single-frequency signal receivers which are used in vehicles. Vehicles are in principle mostly or regularly operated on the road. The effect achieved by the use of mobile dual-frequency signal receivers in or on vehicles is that the function parameters of the ionospheric model are obtained with data that have been determined precisely at the places where the ionospheric model is also used later for position determination. The ionospheric model compiled in the way described here achieves a particularly high accuracy precisely at these places.

Furthermore, the arrangement of dual-frequency signal receivers in or on vehicles may be advantageous because vehicles sometimes form a particularly economical platform for such dual-frequency signal receivers. Optionally, vehicles as a platform in this case also more cheaply than locations rented or leased specifically for the arrangement of dual-frequency signal receivers.

The details, features and advantageous configurations discussed in connection with the method may correspondingly also occur with the method proposed here, and vice versa. To this extent, full reference is made to the comments there for more detailed characterization of the features.

Also intended to be described here are a device for carrying out the described method, as well as a corresponding computer program and a machine-readable storage medium on which this computer program is stored. A device for carrying out the described method is conventionally implemented in a data center or a similar structure. Here, local electron density data from time-of-flight measurements are received and processed according to the described method.

BRIEF DESCRIPTION OF THE DRAWINGS

The solution proposed here, as well as its technical context, will be explained in more detail below with the aid of the figures. It should be pointed out that the disclosure is not intended to be restricted by the exemplary embodiments presented. In particular, unless explicitly explained otherwise, it is also possible to extract partial aspects of the facts explained in the figures and combine them with other components and/or knowledge from other figures and/or the present description. Schematically.

DETAILED DESCRIPTION

Figure 1:
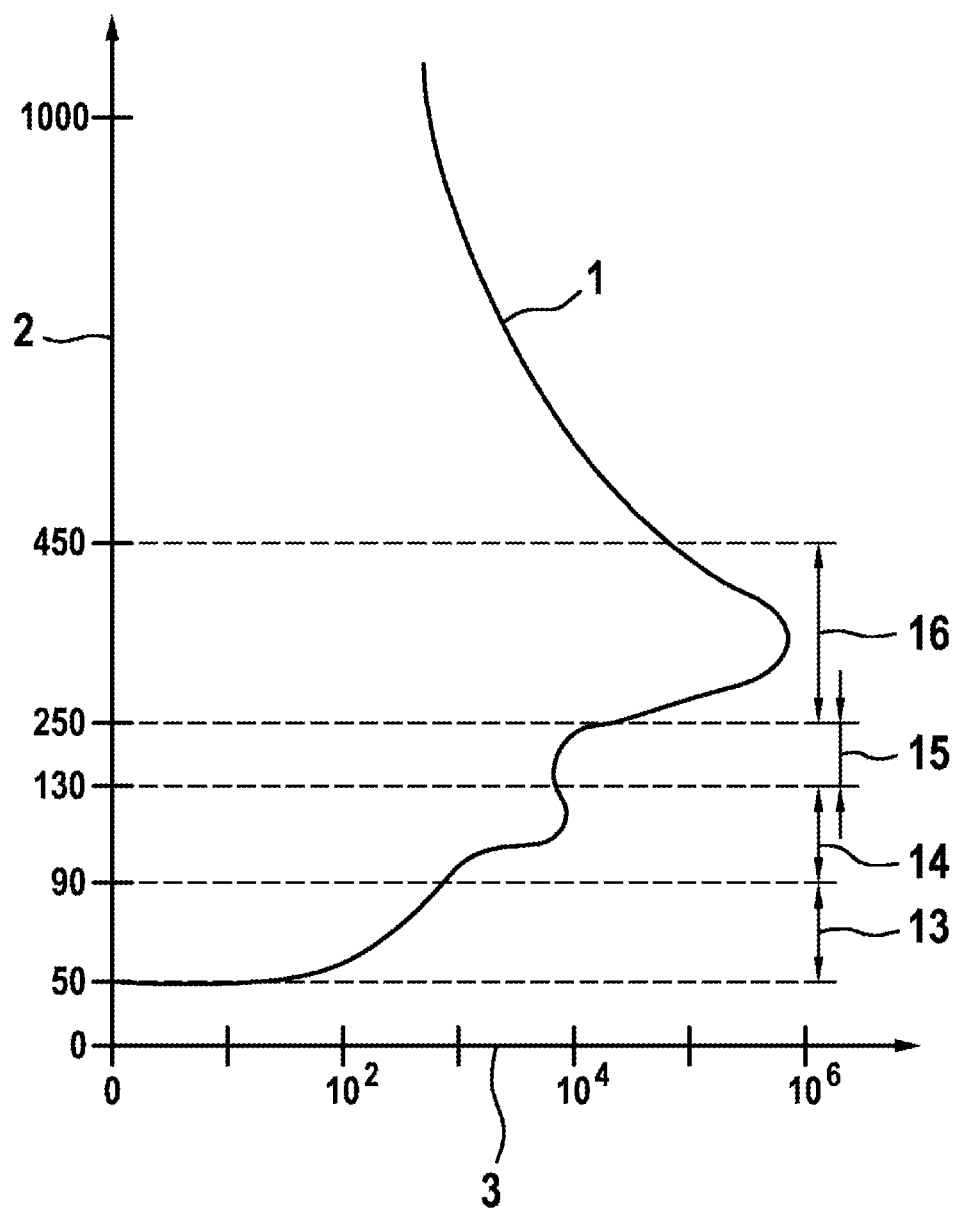
FIG. 1 shows a representation of an electron density profile of the ionosphere.

FIG. 1 schematically shows a representation of an electron density profile 1 of the ionosphere. The electron density 3 in electrons per cubic centimeter is plotted on the abscissa axis, and the height 2 in kilometers is plotted on the ordinate axis. Depending on the electron density and height, distinction is in this case made between the layers D-layer 13, E-layer 14, F1-layer 15 and F2-layer 16. It can be seen that the electron density is greatest in the F2-layer 16, so that the F2-layer 16 has the greatest influence on the signal propagation through the ionosphere.

Figure 2:
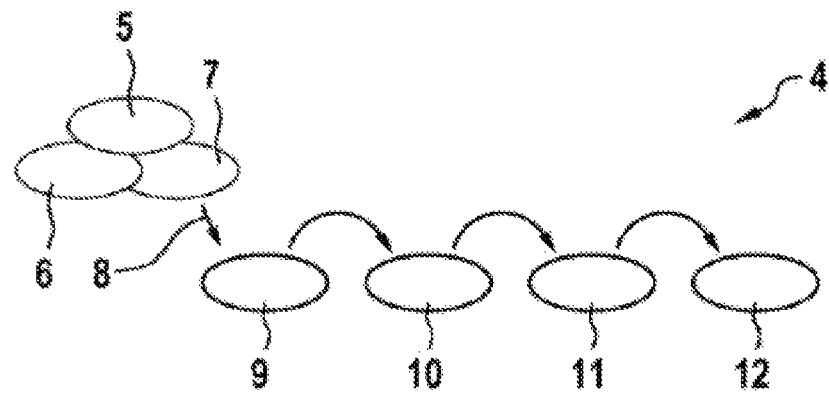
FIG. 2 shows an exemplary model structure of an ionospheric model, in which the method proposed here is used.

FIG. 2 schematically shows an exemplary model structure of an ionospheric model 4 in which the method proposed here is used. In this case, the method is used by way of example in order to determine the electron density distribution in the ionosphere, the electron density determined as a function of height furthermore being used in order to determine the (position-dependent) TEC. FIG. 2 illustrates in this regard the relationship between the individual calculation steps of the ionospheric model 4 for determination of the electron density distribution and of the TEC, on the basis of GNSS observations.

As input quantities, observation quantities from GNSS observations are supplied to the ionospheric model 4. In the context of the method proposed here, the observation quantities comprise not only first parameters 5, which are determined with a multiplicity of static dual-frequency signal receivers, but also second parameters 6, which are determined with a multiplicity of dual-frequency signal receivers that are mobile and, to this end, may be arranged in or on vehicles. Furthermore, other GNSS observations 7 may be used in order to further improve observation modeling on the basis of the first parameters 5 and second parameters 6. The particular advantage of the method is in this case that both static dual-frequency signal receivers and mobile dual-frequency signal receivers are used, so that the ionospheric model 4 is based on a very dense GNSS observation network with high sensitivity for the model parameters.

By way of example, model coefficients 9 are estimated here in the scope of observation modeling 8 by means of the observation quantities, or at least by means of the first parameters 5 and second parameters 6 which have been determined.

The model parameters may be provided to a GNSS user in order to correct the ionospheric influence.

On the basis of the model coefficients 9, position- and time-dependent function parameters 10 for the description of a distribution function of the ionospheric model 4 may be estimated. As the distribution function, the ionospheric model 4 in this case uses, for example, the Chapman function. The position- and time-dependent function parameters 10 therefore comprise at least the maximum electron density along the height, the height at which this maximum electron density occurs, as well as the associated scale height. These three function parameters 10 are estimated as a function of the geodetic longitude, geodetic latitude and as a function of time. The function parameters may be provided to a GNSS user in order to correct the ionospheric influence.

On the basis of these function parameters 10, the distribution function is subsequently evaluated, here the Chapman function. Thus, a four-dimensional distribution of the electrons may be estimated from the function parameters 10 by means of the Chapman function.

By integration along the height, on the basis of the four-dimensional distribution 11 of the electrons, the total electron content (TEC) 12 may subsequently be calculated and indicated as a function of geodetic longitude, geodetic latitude and time. This TEC may be provided to a GNSS user in order to correct the ionospheric influence.

Depending on the available bandwidth and transmission technique, the following correction transmissions to the user may therefore be envisioned on the basis of this model:
transmission of the model coefficients 9 and/or
transmission of the function parameters 10 and/or
transmission of the TEC 12

The proposed solution allows, in particular, the following advantages:
data gaps between static reference stations with dual-frequency signal receivers may be reduced by dense coverage with mobile dual-frequency signal receivers.
The sensitivity of the parameters determined by means of the receivers to a model, for instance a 4D atmospheric or 4D ionospheric model, may be improved by dual-frequency signal receivers which are provided in addition to the static reference stations and which (almost) constantly change their position during operation.

Figure 3:
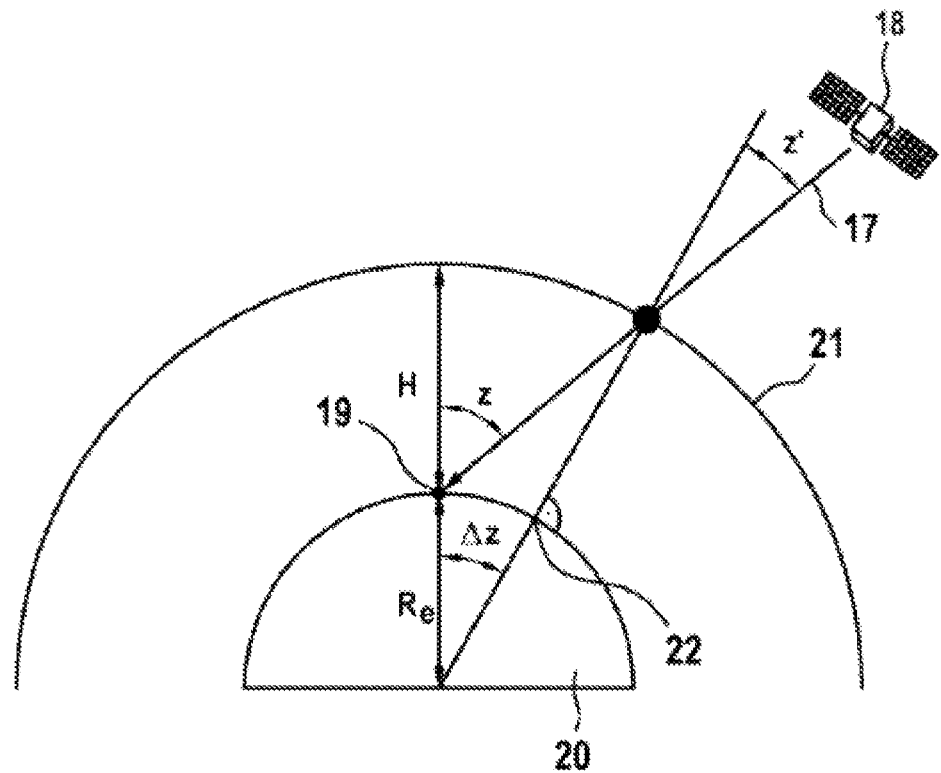
FIG. 3 shows an exemplary signal propagation path of a signal from a satellite to a receiver.

FIG. 3 illustrates the problem of the conventional so-called single-layer TEC model. Here, a signal propagation path 17 of a signal which is emitted by a satellite 18 and received by a receiver 19 on the Earth 20 is shown. The assumption is made that all electrons are concentrated in the infinitesimally thin height line 21 (so-called single layer), so that conversion of the oblique TEC into the vertical TEC can be carried out at the position 22. It can be seen that the signal propagation path intersects this height line 21 at a particular geodetic position 22 which differs from the position of the receiver 19. The height dependency remains ignored by the single-layer approach, so that no conclusions about the vertical electron density distribution are possible.

The invention claimed is:

1. A method for determining a four-dimensional ionospheric model of an electron distribution in Earth's atmosphere, which is used to correct time-of-flight measurements of signals that are transmitted by satellites for position determinations with signal receivers, the method comprising:
a) establishing at least one distribution function based on at least one function parameter that describes a distribution of electrons as a function of height in Earth's atmosphere;
b) receiving data of a first plurality of time-of-flight measurements at a plurality of mobile dual-frequency signal receivers, receiving data of a second plurality of time-of-flight measurements at a plurality of stationary dual-frequency signal receivers, the plurality of stationary dual-frequency signal receivers being arranged in static measurement stations, and determining parameters that are representative of a total quantity of electrons along a signal propagation path from a satellite to the plurality of mobile dual-frequency signal receivers and the plurality of stationary dual-frequency signal receivers;
c) determining function parameters, which are position-dependent and time-dependent, for the at least one distribution function based on the parameters determined in step b);
d) providing the function parameters determined in step c) as a four-dimensional ionospheric model; and
e) determining, with the four-dimensional ionospheric model, correction data, which are provided to a plurality of single-frequency signal receivers to correct position data,
wherein the plurality of mobile dual-frequency signal receivers are arranged at least one of in vehicles and on vehicles.

2. The method as claimed in claim 1, the a) establishing the at least one distribution function further comprising:
establishing the at least one distribution function as at least one of a Chapman function and an Epstein function.

3. The method as claimed in claim 1, the c) determining the function parameters further comprising:
determining the function parameters for the at least one distribution function based on a current position of the plurality of mobile dual-frequency signal receivers.

4. The method as claimed in claim 1, the c) determining the function parameters further comprising:
determining the function parameters for the at least one distribution function as a solution of a system of equations which is set up based on the parameters determined in step b).

5. The method as claimed in claim 1 further comprising:
e) determining, with the four-dimensional ionospheric model, integrity parameters, which are provided to at least one of the plurality of dual-frequency signal receivers and a plurality of single-frequency signal receivers as an integrity measure.

6. The method as claimed in claim 1, wherein the plurality of mobile dual-frequency signal receivers is used to determine the function parameters.

7. A processor for determining a four-dimensional ionospheric model of an electron distribution in Earth's atmosphere, which is used to correct time-of-flight measurements of signals that are transmitted by satellites for position determinations with signal receivers, the processing device configured to:
   a) establish at least one distribution function based on at least one function parameter that describes a distribution of electrons as a function of height in Earth's atmosphere;
   b) receive data of a first plurality of time-of-flight measurements with a plurality of mobile dual-frequency signal receivers, receive data of a second plurality of time-of-flight measurements at a plurality of stationary dual-frequency signal receivers, the plurality of stationary dual-frequency signal receivers being arranged in static measurement stations, and determine parameters that are representative of a total quantity of electrons along a signal propagation path from a satellite to the plurality mobile dual-frequency signal receivers and the plurality of stationary dual-frequency signal receivers;
   c) determine function parameters, which are position-dependent and time-dependent, for the at least one distribution function based on the parameters determined in step b);
   d) provide the function parameters determined in step c) as a four-dimensional ionospheric model; and
   e) determine, with the four-dimensional ionospheric model, correction data, which are provided to a plurality of single-frequency signal receivers to correct position data,
   wherein the plurality of mobile dual-frequency signal receivers are arranged at least one of in vehicles and on vehicles.

8. The device as claimed in claim 7, wherein the processor is configured to execute computer program.

9. A non-transitory machine-readable storage medium that stores a computer program for determining a four-dimensional ionospheric model of an electron distribution in Earth's atmosphere, which is used to correct time-of-flight measurements of signals that are transmitted by satellites for position determinations with signal receivers, the computer program being configured to, when executed:
   a) establish at least one distribution function based on at least one function parameter that describes a distribution of electrons as a function of height in Earth's atmosphere;
   b) receive data of a first plurality of time-of-flight measurements with a plurality of mobile dual-frequency signal receivers, receive data of a second plurality of time-of-flight measurements at a plurality of stationary dual-frequency signal receivers, the plurality of stationary dual-frequency signal receivers being arranged in static measurement stations, and to determine parameters that are representative of a total quantity of electrons along a signal propagation path from a satellite to the plurality mobile dual-frequency signal receivers and the plurality of stationary dual-frequency signal receivers;
   c) determine function parameters, which are position-dependent and time-dependent, for the at least one distribution function based on the parameters determined in step b);
   d) provide the function parameters determined in step c) as a four-dimensional ionospheric model; and
   e) determine, with the four-dimensional ionospheric model, correction data, which are provided to a plurality of single-frequency signal receivers to correct position data,
   wherein the plurality of mobile dual-frequency signal receivers are arranged at least one of in vehicles and on vehicles.

* * * * *